United States Patent [19]

Iwamoto

[11] Patent Number: 5,355,466
[45] Date of Patent: Oct. 11, 1994

[54] SINGLE CHIP MICROCOMPUTER HAVING AN ADDRESS DISCRIMINATION CIRCUIT AND AN OPERATION MODE TERMINAL FOR PROTECTING THE CONTENT OF INTERNAL ROM

[75] Inventor: Shinichi Iwamoto, Tokyo, Japan
[73] Assignee: NEC Corporation, Tokyo, Japan
[21] Appl. No.: 847,332
[22] Filed: Mar. 6, 1992

[30] Foreign Application Priority Data
Mar. 6, 1991 [JP] Japan .................... 3-039641

[51] Int. Cl.$^5$ .................... G06F 12/14; G06F 13/00
[52] U.S. Cl. .................... 395/425; 395/575; 364/DIG. 1; 365/230.03
[58] Field of Search .................... 395/425, 400, 575; 365/189.07, 230.03, 195

[56] References Cited

U.S. PATENT DOCUMENTS

| | | | |
|---|---|---|---|
| 4,153,933 | 5/1979 | Blume, Jr. et al. | 395/325 |
| 4,628,448 | 12/1986 | Murao | 395/800 |
| 4,870,562 | 9/1989 | Kimoto et al. | 395/550 |
| 5,067,077 | 11/1991 | Wakimoto et al. | 395/400 |
| 5,155,829 | 10/1992 | Koo | 395/425 |

FOREIGN PATENT DOCUMENTS 0136155 4/1985 European Pat. Off. .
0308219 3/1989 European Pat. Off. .

*Primary Examiner*—Glenn Gossage
*Attorney, Agent, or Firm*—Whitham, Curtis, Whitham & McGinn

[57] ABSTRACT

A single chip microcomputer coupled to an external memory includes a latch circuit having a data input connected to an operation mode designation terminal and a toggle input connected to a reset terminal, so that a logical value of the operation mode designation terminal is latched in the latch circuit when a resetting state is released. An output of the latch circuit is connected to an address discriminating circuit, which also receives an address so as to discriminate whether the received address is directed to an internal read-only memory (ROM) or an external memory, so that the address discriminating circuit controls an associated selector to cause it to select the internal ROM when the received address is directed to the internal ROM, and to select the external memory when the received address is directed to the external memory or when the output of the latch circuit indicates the external memory. With this arrangement eve if the logical value of the operation mode designation terminal changes after the resetting is released, the output of the latch circuit does not change. Accordingly, when an operation is started int he external memory operation mode, the operation mode is in no way changed to the internal ROM operation mode in the course of execution of a program. Therefore, secrecy of the content of data in the internal ROM can be maintained.

2 Claims, 4 Drawing Sheets

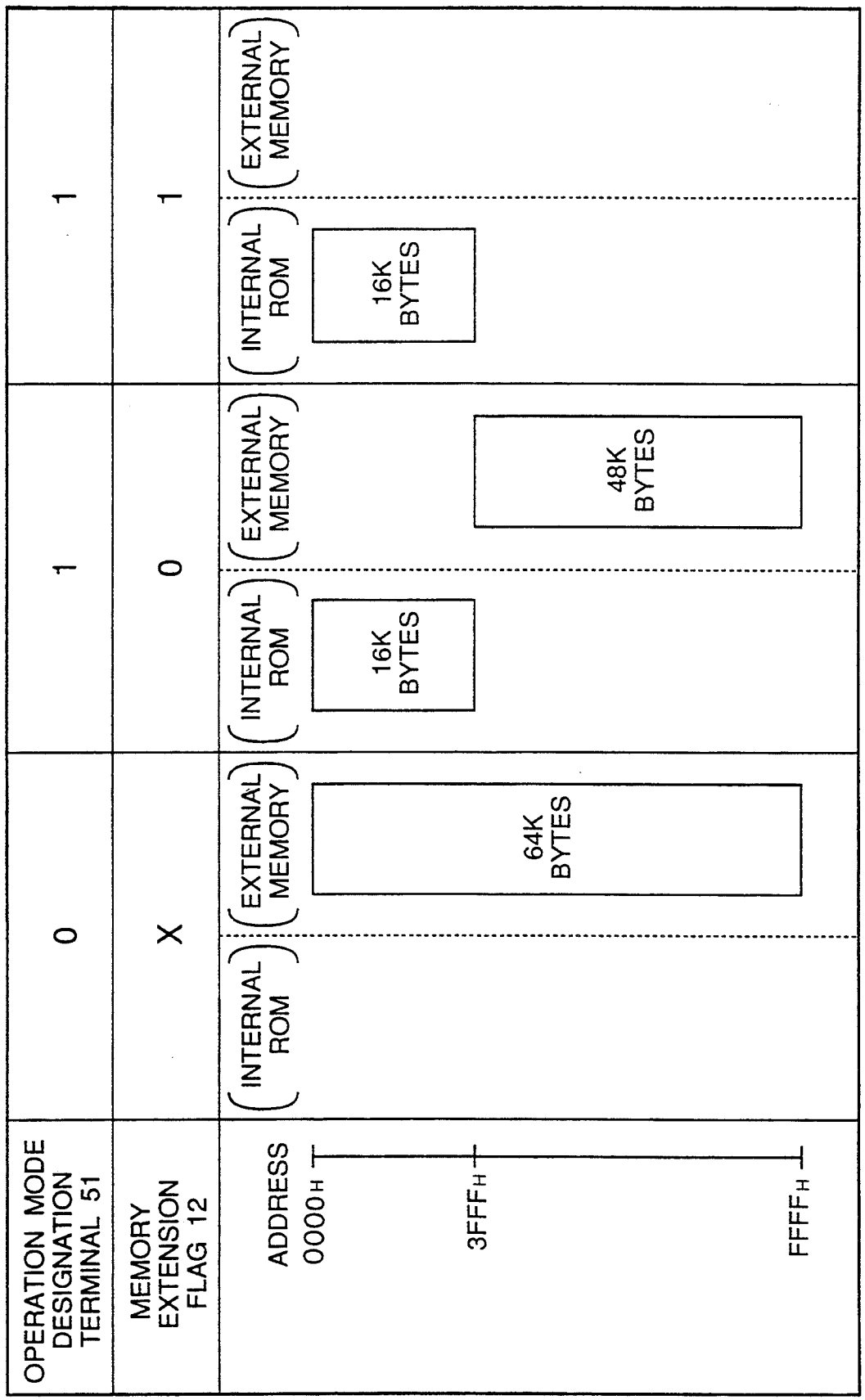

SINGLE CHIP MICROCOMPUTER HAVING AN ADDRESS DISCRIMINATION CIRCUIT AND AN OPERATION MODE TERMINAL FOR PROTECTING THE CONTENT OF INTERNAL ROM

BACKGROUND OF THE INVENTION

1. Field of the invention

The present invention relates to a single chip microcomputer, and more specifically to a single chip microcomputer having a function of protecting the secrecy of the content of an internal ROM.

2. Description of related art

Some conventional single chip microcomputers have an internal ROM (read only memory) operation mode and an external memory operation mode. In this type of single chip microcomputer, an address discriminating circuit is provided internally in the single chip microcomputer so as to discriminate whether an address on an internal address bus is directed to an internal ROM or an external memory. If the address is directed to the internal ROM, the address discriminating circuit controls an associated selector to cause it to select the internal ROM. so that for example a CPU (central processing unit) can access the internal ROM. If the address is directed to the external memory, the address discriminating circuit controls to selector to cause it to select the external memory, so that the CPU can access the external memory.

In addition, there is provided an operation mode designating terminal which is externally accessible. If the operation mode designating terminal is brought to an external memory operation mode designation level, the address discriminating circuit controls the selector to select the external memory, regardless of the address on the internal address bus.

Generally, the external memory has an address space considerably larger than that of the internal ROM. In some cases, a program for reading out a content of the internal ROM is stored in the external memory at a location having an address different from that of the internal ROM. In this case, if the CPU is initialized and the operation mode designating terminal is set to the external memory operation mode designation level, a programmed operation is started from a heading (e.g., a first) address of the external memory. If the program for reading out the content of the internal ROM starts from the heading address of the external memory, the internal ROM reading program is executed. In the course of execution of this reading program, even if the level of the operation mode designating terminal is changed from the external memory operation mode designation level to an internal ROM operation mode designation level, since the address storing the internal ROM reading program is out of an address area of the internal ROM, the address discriminating circuit continues to control the selector to cause it to select the program data stored in the external memory, so that the reading program stored in the external memory is continuously executed.

Further, when the operation mode designating terminal is set to the internal ROM operation mode designation level, if an instruction for sequentially reading the data stored in the internal ROM is executed in the course of execution of the program, since an address to be read is in the address area of the internal ROM. the address discriminating circuit controls the selector to cause it to select the output of the internal ROM. Therefore, the data of the internal ROM is sent through an internal data bus to an external data bus.

Namely, the data stored in the internal ROM of the single chip microcomputer can be easily read out by even a third party by means of the program stored in the external memory, by handling the level of the operation node designating terminal. This is disadvantageous since even a third party can read out the data and therefore the software lacks secrecy.

SUMMARY OF THE INVENTION

Accordingly, it is an object of tile present invention to provide a single chip microcomputer which has overcome the above mentioned defect of the conventional single chip microcomputer.

Another object of the present invention is to provide a single chip microcomputer capable of maintaining the secrecy of a content of data in an internal ROM.

The above and other objects of the present invention are achieved in accordance with the present invention by a single chip microcomputer which includes an internal ROM and which operates by using either the internal ROM or an external memory connected through a predetermined interface terminal, as a data storing means, by a selecting action in accordance with a logical value of a predetermined operation node designating terminal, the single chip microcomputer comprising a latch for latching the logical value at the operation mode designating terminal when a resetting state is released.

With this arrangement, the logical value of the operation mode designation terminal is held at the moment the resetting is released. Thus, even if the logical value of the operation mode designation terminal changes after the resetting is released, the output of the latch circuit does not change. Accordingly, when a operation is started in the external memory operation mode, the operation mode is in no way changed to the internal ROM operation mode in the course of execution of a program. Therefore, secrecy of the content of data in the internal ROM can be kept.

The above and other objects, features and advantages of the present invention will be apparent from the following description of preferred embodiments of the invention with reference to the accompanying drawings.

BRIEF DESCRIPTION OF THE DRAWINGS

FIG. 4 shows a location of the program for reading the internal ROM of the second embodiment.

DESCRIPTION OF THE PREFERRED EMBODIMENTS

Figure 1:
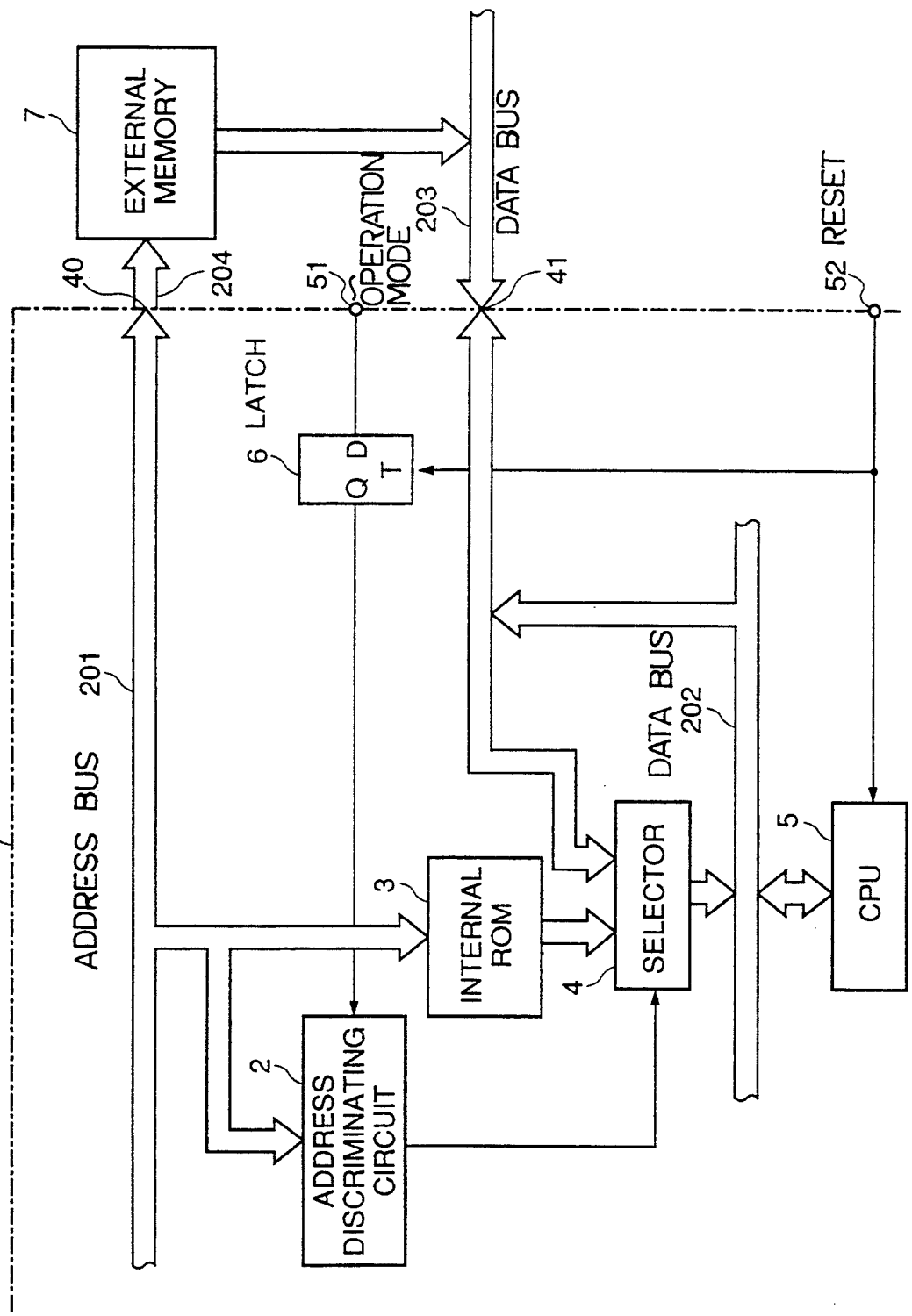
FIG. 1 is a block diagram of a first embodiment of the single chip microcomputer in accordance with the present invention.

Referring to FIG. 1, there is shown a block diagram of a first embodiment of the single chip microcomputer in accordance with the present invention. As shown in FIG. 1, a single chip microcomputer 1 of this embodiment is coupled to an external memory 7, and comprises an address discriminating circuit 2, an internal ROM 3, a selector 4, a CPU 5 and a latch circuit 6, which are coupled as shown. The latch circuit 6 can be formed of for example a D-type flipflop. Other components including an internal RAM and a timer circuit are not shown in FIG. 1 because they do not directly relate to the present invention.

Through an internal address bus 201, an address information is transferred to the address discriminating circuit 2 and the internal ROM 3 of the single chip microcomputer 1, and also to the external memory 7 through an address bus interface terminal 40 and an external address bus 204. An output of the internal ROM 3 is connected to one input of the selector 4, and the output of the selector 4 is connected to an internal data bus 202, which is connected to the CPU 5. The other input of the selector 4 is connected through a data bus interface terminal 41 and an external data bus 203 to the external memory 7. Therefore, the CPU 5 receives the program data and the processing data on the internal data bus 202, and executes a processing on the basis of the received program/processing data. The CPU 5 is also connected to a reset terminal 52 so that the CPU 5 is initialized when the reset terminal 52 is brought to a resetting level. The reset signal supplied from the reset terminal 52 is also supplied to other functional blocks (not shown) within the single chip microcomputer 1.

The address discriminating circuit 2 also receives an output Q of the latch circuit 6. The latch circuit 6 receives at its data terminal D an operation mode designation signal supplied from an operation mode designating terminal 51 and also receives at its toggle input T the reset signal supplied from the reset terminal 52. The latch circuit 6 functions to maintain the level of the operation mode designating terminal 51 when the resetting is released. Namely, the latch circuit 6 latches the level of the operation mode designating terminal 51 at the moment the level of the reset signal constituting the toggle input of the latch circuit 6 is caused to change from a resetting level to a non-resetting level.

When the output of the latch circuit 6 is at an external memory operation mode designation level (called an "Ex level" hereinafter), the address discriminating circuit 2 generates to the selector 4 a level signal having a first level causing it Ic}select the external memory 7, regardless of the address information on the internal address bus 201. When the output of the latch circuit 6 is at an internal ROM operation node designation level (called an "Int level" hereinafter), the address discriminating circuit 2 discriminates whether the received address information designates the internal ROM 3 or the external memory 7. When the received address is directed to the internal ROM 3, the address discriminating circuit 2 outputs a signal having a second level to the associated selector 4 to cause it to select the internal ROM 3. When the received address is directed to the external memory 7, the address discriminating circuit 2 outputs a signal having the first-level to the selector 4 to cause it to select the external memory 7.

The external memory 7 sends to the external data bus 203 the processing data read out in accordance with address information supplied to the external memory 7 through the address bus interface tern-final 40 of the single chip microcomputer I and the external address bus 204. Through the external data bus 203, the processing data outputted from the external memory 7 is transferred to the data bus interface terminal 41 of the single chip microcomputer I and therefore to the internal data bus 202. Oil the other hand, data outputted onto the internal data bus 202 can be transferred through the data bus interface terminal 41 and the external data bus 203 to the external memory 7.

An operation for reading data stored in the internal ROM 3 in the above mentioned single chip microcomputer will now be described.

Figure 2:
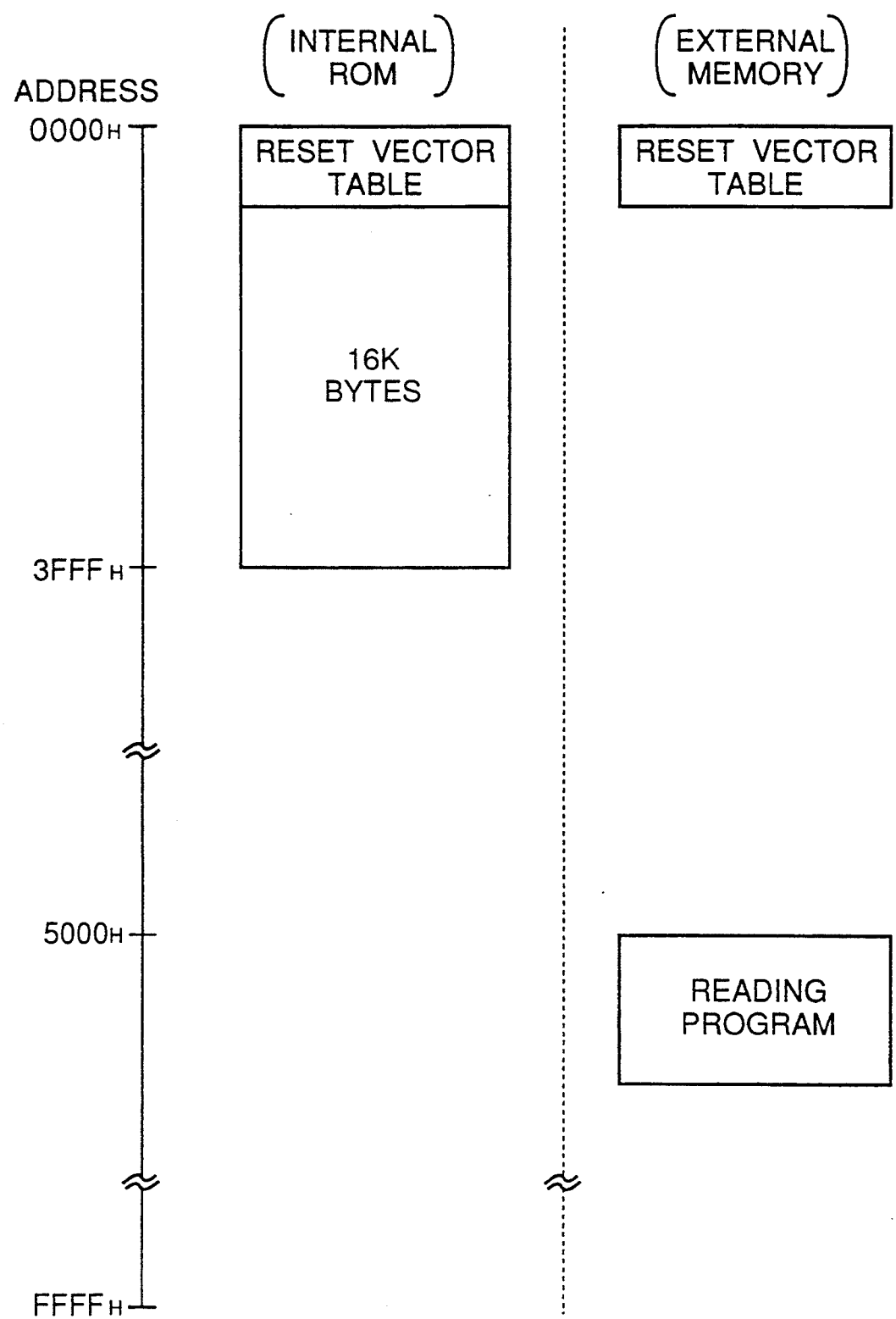
FIG. 2 shows a location of the program for reading the internal ROM of the first embodiment.

First, as illustrated in the location of the reading program shown in FIG. 2, assume that an addressable space in the single chip microcomputer is 64 kilobytes having addresses from 0 to $FFFF_H$ (where the suffix "h" means the hexadecimal notation) and that the capacity of the internal ROM 3 is 16 kilobytes, and also assume that a program for reading the internal ROM 3 is stored in the external memory 7 at addresses which are not mapped to the internal ROM 3 (the addresses starting at the address $5000_H$ in FIG. 2). In addition, a heading address ($5000_H$ in FIG. 2) of the teaching program is also set in a reset vector table for setting a program start address after a resetting.

The program for reading the data of the internal ROM 3 is very simple: After the output level of the latch circuit 6 is changed to the internal ROM operation mode designation level, an instruction for reading the internal ROM 3 is executed. The read-out data is stored in an external RAM (not shown) through the external data bus 203 or read through a predetermined output port.

The internal ROM reading program as mentioned above is stored in the external memory 7, and the operation is started when the reset signal for initialization is inputted from the reset terminal 52 while the operation mode designating terminal 51 is at the Ex level for designating the external memory operation mode (and therefore, the Q output of the latch circuit 6 is also at the Ex level). Here, if the Ex level is at a low ;level, this Ex level can be easily set, for example, by connecting a pull-down resistance to the operation mode designating terminal 51.

The execution of the reading program is started from the heading address of the reading program in accordance with the reset vector table set in the external memory 7. In the course of execution of this program, namely, after the release of the resetting, even if the level at the operation mode designating terminal 5 1 is changed, the output of the Q terminal of the latch circuit 6 does not change, and therefore, the action of the address discriminating circuit 2 does not change. Thus, when the operation is started in the external memory operation mode in the case of the reading program, the operation mode cannot be changed to the internal ROM operation mode in the coarse of execution of the program, and therefore, it is impossible to read the data stored in the internal ROM 3. In this embodiment, accordingly, the addition of the latch circuit 6 enables it to very easily maintain the secrecy of the content of data in the internal ROM 3.

Figure 3:
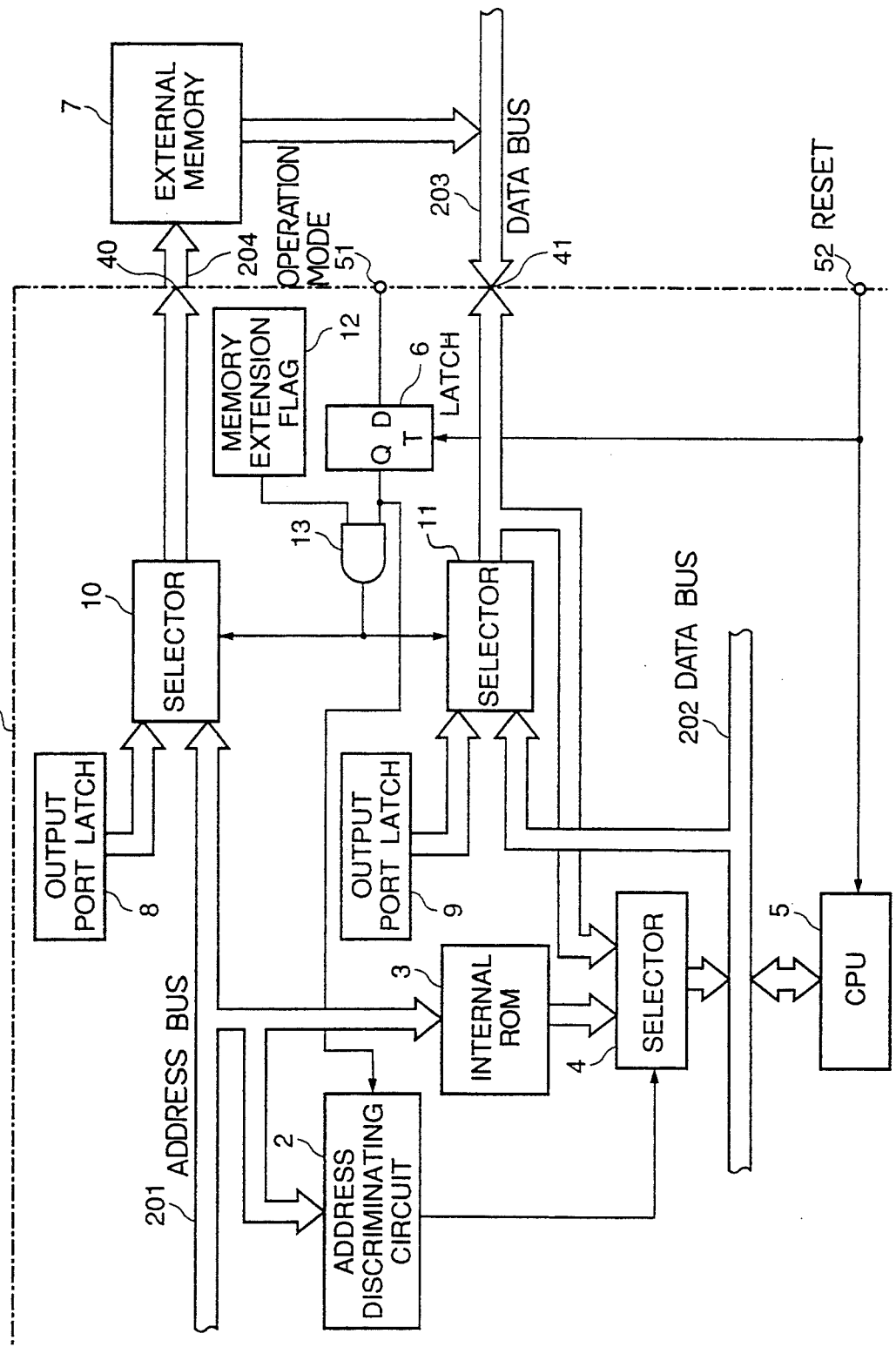
FIG. 3 is a block diagram of a second embodiment of the single chip microcomputer in accordance with the present invention.

Now, a second embodiment of the microcomputer in accordance with the present invention will be described with reference to FIG. 3, which shows a block diagram of the second embodiment. In FIG. 3, elements similar to those shown in FIG. 1 are given the same reference numerals, and explanation thereof will be omitted. Further, FIG. 4 shows a location of the reading program of the internal ROM in the second embodiment.

As shown in FIG. 3, the single chip microcomputer 1 of the second embodiment coupled to the external memory 7 comprises the address discriminating circuit 2, the internal ROM 3, the selector 4, the CPU 5, the latch circuit 6, output port latches 8 and 9, selectors 10 and 11, a memory extension flag 12 and an AND circuit 13, which are coupled as shown.

The circuit, of the second embodiment is more practical than that of the first embodiment mentioned above. The circuit of the second embodiment is different from that of the first embodiment in that the second embodiment additionally includes the selectors 10 and 11 and the output ports 8 and 9 so that the interface terminal can be used as a port in the case of not using the external memory 7 and in that the second embodiment comprises the memory extension flag 12, which makes it possible to operate with respect to an external device in a more elaborate way.

With reference to FIGS. 3 and 4, operation of the address discriminating circuit 2 and the selectors 4, 10 and 11 in combination with the operation mode designating terminal 51 and the memory extension flag 12 will be described. In FIG. 4, the addressable range is mapped to 64 kilobytes of 0 to FFFF$_H$, and the internal ROM 3 is mapped to 16 kilobytes of 0 to 3FFF$_H$.

When the resetting is released, if the operation mode designation terminal 51 is at the Ex level of "0". the Ex level of "0" is latched in the latch circuit 6, and therefore, the address discriminating circuit 2 controls the selector 4 to select the data from the external data bus 203, regardless of the address information, and the selector 4 sends the selected data to the internal data bus 202. At this time, since the output of the AND circuit 13 is at "0" similarly to the Ex level, regardless of the level of the memory extension flag 12, the internal address bus 201 and the internal data bus 202 are connected to corresponding interface terminals 40 and 41 by the selectors 10 and 11, respectively, in accordance with the output "0" of the AND circuit 13. Thus, as shown in FIG. 4, the circuit of the second embodiment uses the external memory 7, regardless of the address value.

When the level of the operation mode designating terminal 51 latched in the latch circuit 6 is "1" and the output level of the memory extension flag 12 is "0", the selector 4 is controlled in accordance with the level signal outputted from the address discriminating circuit 2, so as to select the data from the internal ROM 3 if the address information is in the range of 0 to 3FFF$_H$ and the data from the external memory 7 if it is in the range of 4000$_H$ to FFFF$_H$. In this case, since the output of the AND circuit 13 is "0" similar to the Ex level, the selectors 10 and 11 select the internal address bus 201 and the internal data bus 202, respectively. Thus, as shown in FIG. 4, it is possible to access both the internal ROM 3 and the external memory 7 in accordance with the address information.

Then, when the operation mode designating terminal 51 latched in the latch circuit 6 is at "1" while the output level of the memory extension flag 12 is at "1⇌", the address discriminating circuit 2 controls the selector 4 so as to select the data from the internal ROM 3 if the address information is in the range of 0 to 3FFF$_H$ and the data from the external memory 7 if it is in the range of 4000$_H$ to FFFF$_H$. In this case, however, since the output of the AND circuit 13 is at "1" which is the same level as the Int level, the selectors 10 and 11 select the output port latches 8 and 9, respectively. Thus, as shown in FIG. 4, the interface terminals 40 and 41 output the data latched in the output port latches 8 and 9, not the interface signal to the external memory 7. In this operation mode, therefore, the connection to the external memory 7 is not effected, and it is possible to use the interface terminals 40 and 41 as a port output terminal according to the address information range of the internal ROM 3.

Similar to the first embodiment, the level of the operation mode designating terminal 51 at the moment the resetting is released is maintained in the latch circuit 6 as it is, and therefore, it is impossible to access the internal ROM 3 in the case that the operation was started in the external memory operation mode. Thus, the secrecy of the data stored in the internal ROM is maintained. On the other hand, if the operation was started with the internal ROM operation mode, it is possible to choose whether or not the external memory 7 is used, by re-writing a memory extension flag 12 by means of a programmed operation. Therefore, it is possible to modify the way of using the circuit of the second embodiment in accordance with application systems.

As mentioned above, the present invention has an effect that the secrecy of the content of data in the internal ROM can be kept by providing a latch circuit for latching the level at the operation mode designating terminal at the time of releasing the resetting.

The invention has thus been shown and described with reference to the specific embodiments. However, it should be noted that the present invention is in no way limited to tile details of tile illustrated structures but changes and modifications may be made within the scope of the appended claims.

I claim:

1. A single chip microcomputer for coupling to an external memory through at least an external address bus and an external data bus, the single chip microcomputer comprising:

an internal address bus connected to an address bus interface terminal for coupling to said external address bus;

an internal data bus connected to a data bus interface terminal for coupling to said external data bus;

an internal memory coupled to said internal address bus;

a selector having a first input connected to an output of said internal memory and a second input connected to said internal data bus, an output of said selector being connected to said internal data bus;

an address discriminating circuit coupled to said internal address bus for discriminating whether an address on said internal address bus is directed to said internal memory or said external memory and for generating a selection signal to said selector, so that when the address on said internal address bus is directed to said internal memory, said address discriminating circuit causes said selector to select and output said output of said internal memory, and when the address on said internal address bus is directed to said external memory, said address discriminating circuit causes said selector to select and output data supplied to said internal data bus from said external memory;

a central processing unit coupled to said internal data bus and connected to a reset terminal;

a latch circuit having a data input connected to an operation mode designation terminal and a latch timing control input connected to said rest terminal sot hat said latch circuit latches a logical level on said operation mode designation terminal when said rest terminal is brought from a resetting level to a non-resetting level, an output of said latch circuit connected to said address discriminating circuit and indicating a selected one of said internal memory and said external memory so that when said output of said latch circuit indicates said external memory, said address discriminating circuit causes said selector to select and output the data supplied to said internal data bus from said external memory, regardless of the address on said internal address bus;

whereby, when an operation is started during an external memory operation mode, even if the logical value of said operation mode designation terminal is changed after the resetting is released, the output of said latch circuit does not change, and therefore, the operation mode is in no way changed to an internal read-only (ROM) operation mode in the course of execution of a program, said single chip microcomputer further comprising a second selector having a first input connected to said internal address bus and a second input connected to a first output port latch, an output of said second selector being connected to said address bus interface terminal, a third selector having a first input connected to said internal data bus and a second input connected to a second output port latch, an output of said third selector being connected to said data bus interface terminal, and a logic gate having a first input coupled to a memory extension flag an a second input connected to said output of said latch circuit, an output of said logic gate being connected to a control input of each of said second and third selectors, so that when said output of said latch circuit indicates said internal memory and said memory extension flag does not indicate a memory extension, said first and second output port latches are coupled to said address bus interface terminal and said data bus interface terminal through said second and third selectors, respectively.

2. A single chip microcomputer claimed in claim 1 wherein said logic gate comprises an AND gate.

* * * * *